Patented June 21, 1949

2,474,001

UNITED STATES PATENT OFFICE 2,474,001

OXIDATION OF ORGANIC COMPOUNDS

Irving E. Levine, Berkeley, Calif., assignor to California Research Corporation, San Francisco, Calif., a corporation of Delaware No Drawing. Application May 30, 1945, Serial No. 596,644

13 Claims. (Cl. 260—342)

This invention relates to improvements in the vapor phase catalytic oxidation of organic compounds, more specifically to the catalytic vapor phase oxidation of organic compounds to produce dicarboxylic acids, and particularly to the oxidation of o-xylene to produce phthalic anhydride, in the presence of a catalyst comprising a metallic vanadium carrier with a vanadium oxide indigenous thereto.

The oxidation of organic compounds in the vapor phase has been the subject of extensive investigation during the last 25 years. Many catalysts of various types have been tried with varying success. Several outstanding faults are to be found in currently used catalysts.

One of the faults with present day supported vapor phase oxidation catalysts is their relatively short life. These catalysts are subjected to high temperature vapor streams at very high space velocities. Considerable erosion occurs in the catalyst bed under these conditions. The small particles of eroded catalyst gather in the bottom of the catalyst tubes causing an increased resistance to gas flow through the catalyst bed. As the resistance to gas flow increases, the rate of passage of air-hydrocarbon mixture progressively decreases, and plant shut downs are necessary at frequent intervals to clean out the catalyst tubes. As erosion proceeds the activity of the catalyst is reduced until a point is reached where it is no longer economically feasible to use the catalyst, and the apparatus or plant must be shut down to replace the catalyst. This procedure is very costly, not only from the point of view of time of plant shut-down, but also labor costs to install the catalyst in the tubes which requires very specialized skill. This type of catalyst also gives decreasing yields as the active catalytic material is eroded, thus making the oxidation product progressively more expensive.

An additional fault with the currently used supported vanadium oxide catalysts is the tendency for the vanadium oxide to chip off during handling, and particularly during charging to the converter catalyst tubes. This loss of active catalyst may considerably decrease the efficiency of a given catalyst charge, and very special care is necessary in charging this type of catalyst.

The majority of catalyst supports used in present day practice are of a porous nature. When the catalytic material is deposited on these supports many small pores containing active catalysts are formed. This was formerly considered to be a desirable condition because of the added catalytic surface obtained, but it has been discovered that this is not the best type of catalyst for catalytic vapor phase partial oxidation reactions. Air-hydrocarbon reaction mixture entering these pores frequently remains in contact with the catalyst too long, giving complete oxidation of the organic compound rather than partial oxidation as desired. This over-oxidation or even normal oxidation in the pores gives rise to excessive liberation of heat, which in turn causes a localized hot-spot where additional complete oxidation occurs. Thus, very rigid temperature control is necessary to avoid excessive loss of yield through over-oxidation when using a porous catalyst support.

Porous supports also have a greater tendency to chip than solid supports and, in general, have lower physical strength.

The preparation of catalysts has become a highly technical and specialized art. The activity of the catalyst depends to a great extent on the method of preparation and handling, as well as ingredients used. Slight traces of impurities may completely ruin a batch of catalyst and necessitate its rejection at a considerable cost.

It is an object of this invention to provide a catalyst for the vapor phase oxidation of organic compounds which has a much longer active life than currently used catalysts.

It is another object of this invention to provide a catalyst that will not lose efficiency due to erosion and chipping off of active material.

It is still another object of the invention to provide a catalyst capable of self-regeneration during plant operation.

It is a further object of this invention to provide a non-porous support which will eliminate local overheating due to entrapped air-hydrocarbon mixture, and will provide better physical strength.

It is another object of this invention to eliminate the necessity of highly technical catalyst preparation.

In accordance with these and other objects which will become apparent from the disclosure given below, my invention consists in a granular vanadium metal catalyst support with a thin oxide formed integral therewith and indigenous thereto, said metallic support being preferably vanadium or an alloy of vanadium, said oxide being an oxide of vanadium or a mixture of an oxide of vanadium and oxides of the other alloying metals.

Said catalyst is preferably prepared by one of the following methods:

1. A granular vanadium metal is screened to give a moderately uniformly sized product in the range of 4 to 14 mesh, or preferably 6–12 mesh, and especially 8–10 mesh material. Said screened metal is placed in the catalyst tubes in which it is to be used, and the mass heated to such a temperature that a stream of air, or other oxygen-containing gas, passing over said metal will form a vanadium metal oxide indigenous thereto. A temperature in the range 750°–1500° F. may be used, and preferably a temperature between 900°–1300° F. This treatment renders the catalyst ready for use.

2. An alternative method of preparation is to pass a mixture of an excess of an oxygen-containing gas and the vaporized hydrocarbon to be oxidized over the screened metal contained in the catalyst tube, the mass being heated to ordinary reaction temperature. A thin vanadium metal oxide develops after a short time, and the catalyst is then ready for productive use.

3. Another method of preparing the catalyst is to place the screened metal in a container in such a manner that air or oxygen may contact the surface of said metal. The whole is then heated to within the temperature range specified in Example 1 above for a time sufficient to form a thin vanadium metal oxide indigenous to said metal. The material is then charged to the catalyst tubes, and is ready for use.

4. The catalyst may also be prepared by causing the screened metal to react superficially with a chemical to form a vanadium metal salt on the surface of said metal. Said vanadium metal salt may then be converted to the oxide by any of the means described above. The catalyst is then ready for use.

5. Another method of preparing the catalyst is to form a vanadium oxide on the vanadium metal carrier by deposition of a vanadium salt, such as ammonium meta vanadate, and ignition to the oxide, or by dipping the vanadium metal carrier in molten vanadium oxide, or by any other well known method.

The advantage gained in the last two examples given above lies in the fact that although the oxide coating is not indigenous to the vanadium metal carrier, continuous plant operation is possible while the indigenous vanadium oxide is being formed. As the non-indigenous vanadium oxide is eroded, the excess oxygen in the oxygen-containing hydrocarbon mixture oxidizes the exposed surface of the vanadium metal carrier, thus forming a vanadium metal oxide indigenous to said vanadium metal. The non-indigenous vanadium oxide is thus replaced by the desired vanadium metal oxide indigenous to said vanadium metal, while at the same time maintaining maximum production of the desired oxidation product.

A vanadium metal-indigenous vanadium metal oxide catalyst prepared in any of the above ways has several advantages over catalysts currently used in vapor phase catalytic oxidations. Said catalyst is not subject to erosion to as great a degree as the commonly used catalysts, because the bond of metal oxide to metal carrier is much stronger than the bond of metal oxide to inert carrier commonly used. Furthermore, any erosion which does occur does not affect the over-all activity of the catalyst because as soon as a portion of the oxide is removed, the metal thus exposed is immediately reoxidized by the excess of oxygen in the hydrocarbon mixture passing over it, to again form the vanadium metal oxide. The over-all efficiency of the catalyst is thus not appreciably impaired by either erosion or mechanical chipping off of metal oxide.

A further advantage of said catalyst is in its considerably longer life. Plant shut-downs are necessary only when the catalyst volume has been sufficiently reduced to affect yields. Even then it is frequently sufficient to simply add more screened metal to the top of the tubes and resume operations, instead of completely removing the exhausted carrier and replacing it with freshly prepared catalyst. Installation of said metal catalyst requires no special skill nor the extremely careful handling as in the case of the inert carrier-metal oxide catalyst. This is especially true when the preferred method of oxidizing the metal in situ is used.

A further advantage of said metal-metal oxide catalyst is its non-porous nature, thus eliminating the possibility of over-oxidation in catalytic pores producing localized hot-spots which result in difficult temperature control and lowered yields. The solid metallic support also gives better physical strength than a porous support. The metallic granules have high heat conductivity which tends to even out temperature and allow better process control.

Another advantage of said metal-metal oxide catalyst is that difficulties from contamination are practically eliminated, especially if the first three methods of preparation are used. It now becomes a very simple matter to prepare these vapor phase oxidation catalysts which have heretofore been very difficult and expensive to prepare.

In using said metal-metal oxide catalyst according to this invention, a mixture of an oxygen-containing gas (i. e. air) and vaporized hydrocarbon is passed over a catalyst bed prepared by any of the methods given above. The converter, containing the catalyst tubes in a heat-regulating bath, may be of any conventional design. The oxidation of the hydrocarbon vapor is controlled by regulating the interdependent variables: bath temperature, hot-spot temperature, contact time, and air-hydrocarbon ratio. The products of the partial oxidation are collected in any conventional manner and purified.

The following specific examples which are given for illustrative purposes only will illustrate my invention without limiting it to the precise details set forth:

*Example 1*

A 30" x 5/8" i. d. catalyst tube surrounded by a liquid mercury bath for the lower 26 inches of its length and mercury vapor for the top 4 inches, and with 2 inches of inert material in the bottom, is filled with 22 inches of 8–10 mesh 90% vanadium metal. Four inches of aluminum turnings are placed in the tube, on top of the catalyst, to act as a heat exchanging medium and to rapidly mix the incoming gases. The temperature of the mercury bath is maintained at 900° F. by appropriately regulating nitrogen pressure on the mercury system. When the metal has reached bath temperature, a stream of air is passed over it for about 60 hours or until a thin coating of oxide is formed. The air stream is then allowed to cool, and vaporized xylene containing approximately 80% o-xylene is mixed with the air prior to entering the catalyst tube. The air and hydrocarbon are mixed in a mole ratio of 133 to 1. The air-xylene mixture is passed through the catalyst bed at such a rate that the contact time will be .06 to .07 seconds. Under these conditions the o-xylene will be partially oxidized to phthalic anhydride, and the m- and p-xylenes will be practically completely oxidized to CO₂ and H₂O. The exothermic heat of reaction of these reactions is sufficient to maintain the hot zone of the catalyst bed at 1100° to 1150° F. The oxidation products leave the catalyst chamber at the bottom, are cooled, and the phthalic anhydride is collected and purified. A yield of approximately 80% purified phthalic anhydride is obtained.

*Example 2*

The catalyst tube is prepared as in Example 1 above. After the mass has been heated to bath temperature, a mixture of air and xylene vapor in a mole ratio between 50 to 1 and 150 to 1 is passed into the top of the catalyst tube maintained at 900° F. The oxidation of the catalyst is complete in about 60 hours, and normal yields of phthalic anhydride are obtained thereafter. The phthalic anhydride is recovered and purified.

*Example 3*

The catalyst tube is filled and the catalyst oxidized as in Example 1. Air is mixed with vaporized naphthalene in a mole ratio of 100 to 1, and is passed through a catalyst tube maintained at 900° F. A contact time of .07 to .08 seconds is used and a hot zone temperature of 1100°–1150° F. is produced. The principal product of the reaction is phthalic anhydride, which is collected and purified. A yield of about 85% of theoretical is obtained.

*Example 4*

200 cc. of 8–10 mesh 90% vanadium metal is placed in a flat pan in a muffle furnace and heated to 1250° F. After 30 minutes the pan is removed, the metal cooled and charged to the catalyst tube as in Example 1 above. A mixture of air-xylene is passed over the catalyst as in Example 1, and phthalic anhydride is produced in approximately 80% yield.

*Example 5*

The catalyst tube is prepared as in Example 1 above, and a mixture of air-naphthalene in a mole ratio of 100 to 1 is passed over the catalyst maintained in a bath at 825° F., at such a rate that the contact time is 0.4 seconds and the hot zone temperature is about 900° F. The phthalic anhydride thus produced is separated and purified.

*Example 6*

200 cc. of 8–10 mesh 90% vanadium metal is placed on a screen and dipped into a bath of molten vanadium oxide, the screen is removed and drained. The vanadium oxide coated vanadium metal is then charged to a catalyst tube as in Example 1 above. Phthalic anhydride is produced by any of the methods outlined above.

*Example 7*

The catalyst tube is prepared by any of the methods given above. A mixture of air-benzene in a mole ratio of about 100 to 1 is passed over the catalyst maintained in a bath at 900° F. A contact time of about .08 seconds and a hot zone temperature of about 1100° F. are used. Maleic anhydride is produced in approximately 85% yield.

By a vanadium metal is is to be understood that I mean a metal containing vanadium in an amount greater than 50% of the weight of the alloy, and preferably greater than about 75% of the weight of the alloy. Instead of using 90% metallic vanadium as in the above examples, I may use any vanadium metal alloy capable of catalyzing vapor phase oxidation reactions in which vanadium is a principal constituent, such as 95%, 90%, or 80% commercial vanadium or any of the above with small amounts of molybdenum, titanium, manganese, copper, nickel, as alloying constituents.

Typical approximate analyses of the commercial vanadium metals as referred to above are:

95% grade: 95.2% vanadium, 2.0% aluminum, 0.4% iron.

90% grade: 91.2% vanadium, 3.9% aluminum, 2.0% iron.

80% grade: 81.2% vanadium, 12.9% aluminum, 1.7% iron.

Instead of using a composition of xylene described above, I may use a xylene having an ortho content of between 75 and 100%; or instead of using naphthalene or xylene, I may use any organic compound capable of being partially oxidized under controlled conditions, for example, benzene or toluene to give maleic anhydride.

While the character of this invention has been described in detail and various illustrations given in connection with the partial or selective oxidation of certain aromatic hydrocarbons, it is to be understood that the invention in its broader aspects is not limited thereto but includes the partial or selective oxidation of other organic compounds and particularly of other aromatic hydrocarbons which contain at least one benzene ring or nucleus and substitution products of these hydrocarbons. It will be apparent to those skilled in the art that numerous molifications and variations of the above examples may be effected in the practice of the invention which is of the scope of the claims appended hereto.

I claim:

1. A process of catalytic oxidation of naphthalene to produce phthalic anhydride, which comprises passing vaporized naphthalene mixed with an excess of an oxygen-containing gas over a catalyst comprising a vanadium metal carrier with an indigenous coating of a vanadium oxide.

2. A process of catalytic oxidation of a mixture of alkyl benzene compounds, containing a major proportion of ortho dialkyl benzene compounds, to produce phthalic anhydride, which comprises passing the vaporized hydrocarbon compound mixed with an excess of an oxygen-containing gas over a catalyst comprising a vanadium metal carrier with an indigenous coating of a vanadium oxide.

3. A process of catalytic oxidation of a mixture of xylenes, containing a major proportion of o-xylene to produce phthalic anhydride, which comprises passing the vaporized xylenes mixed with an excess of an oxygen-containing gas over a catalyst comprising a vanadium metal carrier with an indigenous coating of a vanadium oxide.

4. A process of catalytic oxidation of benzene to produce maleic anhydride, which comprises passing the vaporized benzene mixed with an excess of an oxygen-containing gas over a catalyst comprising a vanadium metal carrier with an indigenous coating of a vanadium oxide.

5. A process for the production of partial oxidation products of aromatic hydrocarbons which comprises oxidizing a vaporized aromatic hydrocarbon with an oxygen-containing gas, said oxygen-containing gas being present in amounts greater than the stoichiometric amounts required to produce said desired partial oxidation products, in the presence of a catalyst comprising vanadium metal with an indigenous coating of a vanadium oxide.

6. A vapor phase oxidation catalyst which comprises a granular vanadium metal alloy carrier in which vanadium is present as the major component with an indigenous coating of a vanadium oxide.

7. A vapor phase oxidation catalyst which comprises a granular vanadium metal alloy carrier containing vanadium as a major constituent and molybdenum as a minor constituent with an indigenous coating of a vanadium oxide.

8. A method of preparing an oxidation catalyst which comprises passing an oxygen-containing gas over a granular vanadium metal catalyst carrier maintained at temperatures within the range of 750°–1500° F. to form an indigenous coating of vanadium metal oxide on said carrier.

9. A method of preparing an oxidation catalyst which comprises passing an oxygen-containing gas over a vanadium metal alloy catalyst carrier, in which vanadium is present as the major component, while maintaining the vanadium alloy at temperatures within the range of 750°–1500° F., to form an indigenous vanadium metal oxide coating on said catalyst carrier.

10. A method of preparing an oxidation catalyst which comprises passing a stream of air over a granular vanadium metal catalyst carrier maintained at temperatures within the range of 750°–1500° F. to form an indigenous coating of vanadium metal oxide on said carrier.

11. A method of preparing an oxidation catalyst which comprises passing a stream of air over a vanadium metal alloy catalyst carrier, in which vanadium is present as the major component, while maintaining the vanadium alloy at temperatures within the range of 750°–1500° F., to form an indigenous vanadium metal oxide coating on said catalyst carrier.

12. A vapor phase oxidation catalyst which comprises a granular vanadium metal alloy carrier in which vanadium is present as the major component, said carrier having a particle size in the order of 4 to 14 mesh, and an indigenous coating of a vanadium oxide.

13. A process for the production of partial oxidation products which comprises oxidizing a vaporized hydrocarbon of the benzene series selected from the group consisting of benzene, toluene and xylene with an oxygen-containing gas, said oxygen-containing gas being present in amounts greater than the stoichiometric amounts required to produce said desired partial oxidation products, in the presence of a catalyst comprising vanadium metal with an indigenous coating of a vanadium oxide.

IRVING E. LEVINE.

REFERENCES CITED

The following references are of record in the file of this patent:

UNITED STATES PATENTS

| Number | Name | Date |
| --- | --- | --- |
| 1,636,857 | Craver | July 26, 1927 |
| 1,853,771 | Larson | Apr. 12, 1932 |
| 1,895,522 | Punnett | Jan. 31, 1933 |
| 1,909,355 | Jaeger | May 16, 1933 |
| 2,114,798 | Foster | Apr. 19, 1938 |
| 2,120,538 | Andrews | June 14, 1938 |
| 2,142,678 | Porter | Jan. 3, 1939 |
| 2,260,409 | Slotterbeck et al. | Oct. 28, 1941 |
| 2,270,874 | Gwynn | Jan. 27, 1942 |
| 2,299,871 | Baird | Oct. 27, 1942 |
| 2,340,021 | Sabia | Jan. 25, 1944 |

FOREIGN PATENTS

| Number | Country | Date |
| --- | --- | --- |
| 635,717 | France | Jan. 2, 1928 |
| 381,570 | Great Britain | Oct. 3, 1932 |

OTHER REFERENCES

Mellor—Inorganic and Theoretical Chemistry, vol. 9, page 739.